United States Patent

Mueller

[11] 4,025,785
[45] May 24, 1977

[54] METHOD OF AND APPARATUS FOR THE AUTOMATIC FOCUSING OF STEREOSCOPIC MICROSCOPES

[75] Inventor: Ortwin Mueller, Koenigsbronn, Germany

[73] Assignee: Carl Zeiss-Stiftung, Oberkochen, Germany

[22] Filed: May 6, 1975

[21] Appl. No.: 575,026

[30] Foreign Application Priority Data

May 13, 1974 Germany .......................... 2423136

[52] U.S. Cl. .................................. 250/204; 250/558
[51] Int. Cl.² ......................................... G01J 1/36
[58] Field of Search .......... 250/201, 204, 558, 209; 354/162, 163; 178/DIG. 29

[56] References Cited
UNITED STATES PATENTS

| | | | |
|---|---|---|---|
| 3,418,477 | 12/1968 | Knutrud et al. | 250/201 |
| 3,628,857 | 12/1971 | Harvey | 250/204 |
| 3,721,827 | 3/1973 | Reinheimer | 250/201 |
| 3,846,629 | 11/1974 | Stauffer | 250/209 |
| 3,883,689 | 10/1975 | Mansour et al. | 178/DIG. 29 |

*Primary Examiner*—David C. Nelms
*Attorney, Agent, or Firm*—Hopgood, Calimafde, Kalil, Blaustein & Lieberman

[57] ABSTRACT

For automatic focusing of a stereoscopic microscope a focusing beam of rays, preferably in the infrared range of wave length, is generated by a pulse light source, and focused on the object to be observed in the form of a small luminous area which is superimposed on the observation rays. The rays reflected back by the object along the divided paths of the observation rays are deflected from those paths and directed to impinge on separate photoelectric detectors which convert axial shifts of the object plane with respect to the microscope into a directionally dependent electric signal which controls a focusing motor to move the microscope to compensate for such shifts. A switch is provided to permit manual adjustment of focus preparatory to automatic adjustment.

10 Claims, 1 Drawing Figure

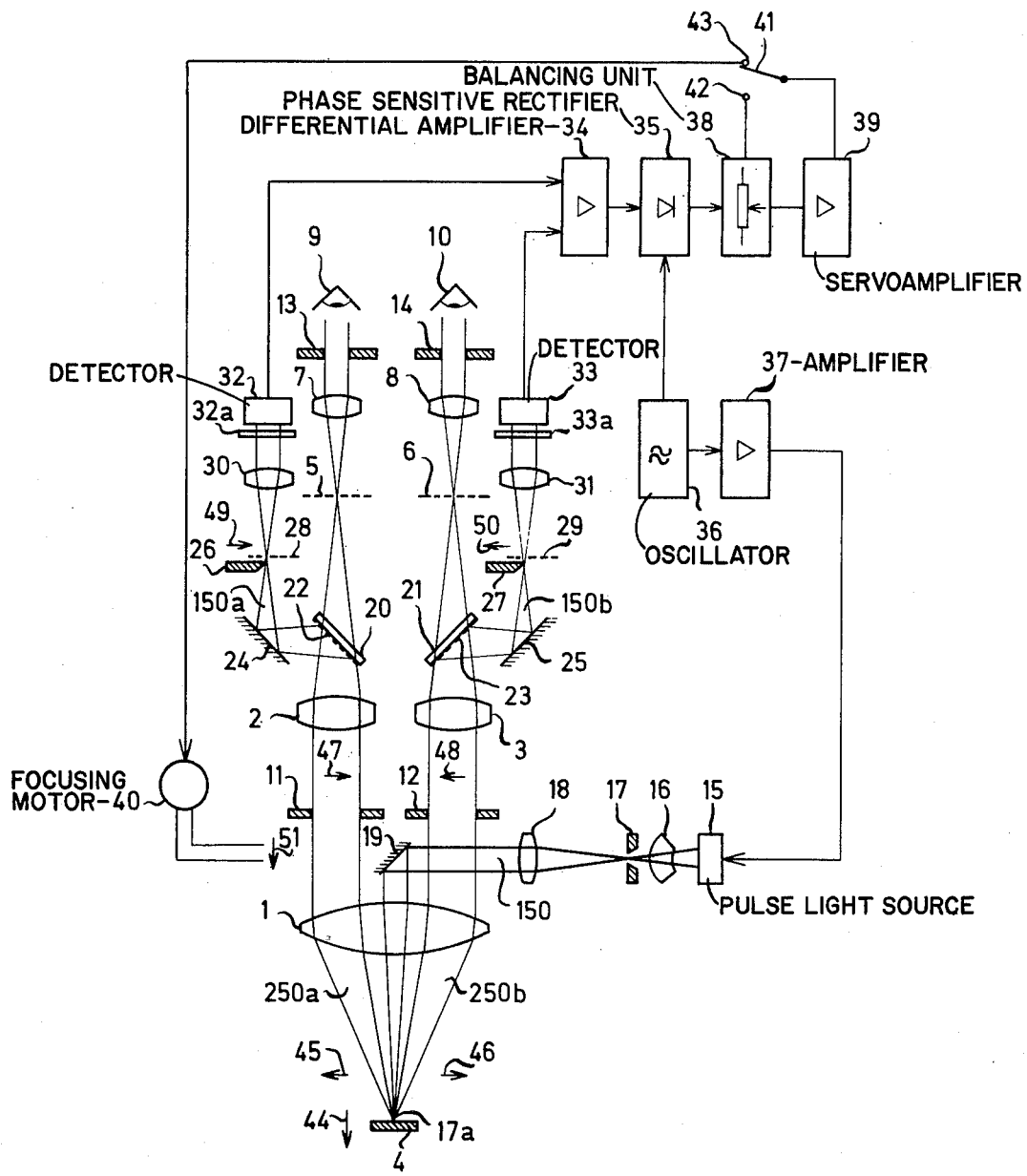

METHOD OF AND APPARATUS FOR THE AUTOMATIC FOCUSING OF STEREOSCOPIC MICROSCOPES

This invention relates to a method of and apparatus for the automatic focusing of stereoscopic microscopes as used for surgery and the like.

The surgical microscope as an aid, for example, to the ophtalmologist, otologist and neurologist is indispensable to the practice of modern medicine. The tendency is in the direction of performing increasingly complicated operations, and performing known operations on more patients in less time by increased use of apparatus. Such a development, however, very quickly reaches an efficiency limit if the apparatus, apart from improved functioning, also requires more handling. The surgical microscope reveals an efficiency limit in that high magnification is obtained only at the expense of less depth of focus and critical focusing. Moreover, the surgeon actually has no free hand to effect focusing.

In the monocular microscope field, solutions for the problem of automatic focusing have become known which, however, cannot be applied in the present case because the problems encountered in stereoscopic microscopes and in surgical microscopes based on the stereoscopic principle differ substantially from the problems encountered in monocular microscopes. In stereoscopic microscopes, it is of particular importance that both paths of rays participate in the generation of the signal for automatic focusing so that the structure of the object has no influence on the result. Also, whenever instruments are used in connection with a surgical microscope, which in the treatment of the patient may cover the object temporarily, it is desirable that the automatic focusing be operated only intermittently instead of being operated continuously.

Prior art surgical microscopes are known which are equipped with an electric motor for focusing and which are actuated by means of a foot actuated lever. This solution, however, is only partly satisfactory because the focusing operation conflicts with the performance of a number of other instrumental functions which must also be foot-actuated.

It is, therefore, an object of this invention to relieve the user of a stereoscopic microscope as used for surgery operating functions of focusing during a great part of the time of use.

According to the present invention, this object is attained by a method in which a luminous spot is generated on the object by means of an additional beam of focusing rays, and in which this luminous spot is imaged at intermediate image planes by a stereoscopic system. The focusing beam of rays may be superposed on the observation path of rays or separated from the latter. The entrance pupils of the images of the luminous spot are imaged onto two photoelectric detectors arranged in the exit pupils of the beam of rays. The said detectors convert an axial shift of the object plane defined by the luminous spot to a directionally dependent electric signal, which is used for controlling a focusing motor which causes the microscope body to follow in such manner that the focal plane of the objective constantly coincides with the object.

Preferably, the cones of rays of the focusing beams in the intermediate image planes or in planes optically corresponding to the same, are cut by beam-intercepting means so that when the cones of rays of the focusing beams shift vertically due to defocusing, a directionally dependent differential signal is generated by the photoelectric detectors, which can subsequently be amplified and rectified phase-sensitively and used to actuate the focusing adjustment.

An appropriate apparatus for carrying out the method of the invention comprises a luminescence or laser diode controlled by a pulse current as a light source for the focusing beam of rays. Beamsplitting means are arranged in the two stereoscopic paths of rays between objective and eyepiece which deflect the focusing light reflected at the object out of the path of the observation rays. Beamintercepting means consisting of opaque blades are located in the paths of the focusing beams of rays, and are oriented in the same direction, partially blocking the respective fields of view. These are each succeeded by an eyepiece lens and a photoelectric detector. A differential amplifier with a phase-sensitive rectifier is connected to the photoelectric detectors. An oscillator is provided for the control of the rectifier which also supplies the pulse current for the pulse light source via a power amplifier. There is also provided a balancing unit for the initial focusing adjustment as well as a servoamplifier for generating the operating current for the focusing motor.

The signal obtained from the servoamplifier is controlled by a switch. In one switch position, the signal is supplied to a motor potentiometer arranged in the balancing unit, for initial visual adjustment of the focusing by manual adjustment of the focusing motor. In the other switch position, the signal is supplied to the focusing motor for automatic follow-up control of the microscope.

In order to make possible undisturbed observation within the visible spectral range, it is advantageous to use an infrared light source for the pulse light and to deflect the focusing beam from the path of the observation rays of the microscope by the use of transparent beam splitters of predominantly infrared reflection.

An important advantage of the invention is that it is insensitive to extraneous and interfering light and that its "range of capture" is very great and corresponds to the adjusting range common in surgical microscopes having a sensitivity of critical focusing of 0.1 mm. The initial balancing of the automatic focusing arrangement can be accomplished by the user merely by actuating a switch and thereafter focusing the microscope in the conventional manner by available means. Thereafter, by changing the position of the switch, the device operates automatically. By use of the electric balancing unit, all minor geometrical, mechanical, electrical and thermal fluctuation values are constantly eliminated.

A preferred embodiment of the invention is schematically illustrated in the drawing.

The stereoscopic microscope schematically illustrated in the drawing comprises an objective lens 1 common to both stereoscopic paths and the further objective lenses 2 and 3 for the divided paths of rays 250a and 250b. The objectives 2 and 3 image the object 4 at the intermediate image planes 5 and 6. The intermediate images at 5 and 6 may be observed through the two eyepieces 7 and 8, reference numerals 9 and 10 symbolizing the two eyes of the observer. The locations of the entrance pupils 11 and 12 as well as the exit pupils 13 and 14 of the beams are also indicated.

For the automatic focusing of the stereoscopic microscope, the pulse light source 15 is provided which emits a focusing beam of rays 150 homogeneously illuminating the circular stop 17 via the condenser lens 16. By means of the lens 18, the deflecting mirror 19 and the objective lens 1, the beam is imaged onto the object 4 on which a homogeneous small circular luminous spot 17a is produced. In the illustrated embodiment, the pulse light source 15 comprises a gallium arsenide luminescence diode emitting in the wavelength range of about 900 nm. Since the radiation is in the infrared range, the additional light spot 17a does not disturb the normal observation through the microscope in any way.

By the two paths of rays 250a and 250b of the stereoscopic microscope, the luminous spot 17a on the object 4 is also imaged at the intermediate image planes 5 and 6. In front of these planes, however, the beam splitting mirrors 20 and 21 are arranged, inclined at 45° to the axis of the beam and having thin reflecting layers 22 and 23 which predominantly reflect wavelengths of about 900 nm. These 45° mirrors accordingly deflect the major portion of the infrared light of beams 150a and 150b out of the two stereoscopic paths of rays 250a and 250b without impairing the observation of the object by the two main paths of ray.

The infrared radiation beams deflected via the mirrors 24 and 25 are partially intercepted by the blades 26 and 27 oriented in the same direction, which partially block the respective fields of view in the vicinity of the intermediate image planes 28 and 29 corresponding to 5 and 6. The blades are followed by the lenses 30 and 31, corresponding to the eyepieces 7 and 8, and the beams impinge on the two photoelectric detectors 32 and 33.

These two photoelectric detectors are provided at locations corresponding to the exit pupils 13 and 14. They are preferably silicon photodiodes which respond with high sensitivity to the wavelength 900 nm of the pulse light used for focusing.

During defocusing, a differential signal is generated by the photoelectric detectors 32 and 33 which is amplified in the differential amplifier 34 and is then passed to the phase-sensitive rectifier 35. This rectifier is controlled by the oscillator 36 which also supplies the pulse current for operation of the pulse light source 15 via the power amplifier 37.

The rectified differential signal is first supplied from the rectifier 35 to the balancing unit 38 which includes a motor potentiometer for initial adjustment of the apparatus. A servoamplifier 39 generates the operating current for the focusing motor 40, said operating current being supplied to the motor via the switch 41 engaging the contact 43 as illustrated in the drawing. Upon defocusing, the focusing motor 40 moves the whole stereoscopic microscope in such a manner that the object 4 always returns into the focal plane.

A differential signal is generated upon movement of the object 4 out of the focal plane in the direction of the arrow 44. When this occurs, the paths of the rays in front of the objective lens 1 are shifted in the directions indicated by the arrows 45 and 46. This results in an equivalent shift of the path of the rays within the stereoscopic microscope behind the lens 1 in the directions indicated by the arrows 47 and 48. As a result, the intermediate images at image planes 28 and 29 now shift in the direction indicated by the arrows 49 and 50 with respect to the stationary blades 26 and 27, causing the photoelectric detector 32 to obtain more light and the photoelectric detector 33 less light than prior to the beginning of movement of the object in the direction of the arrow 44. Thereby, a differential signal is generated by the photoelectric detectors, which, by means of electronic units 34, 35, 38 and 39, causes the focusing motor 40 to move the stereoscopic microscope in the direction of the arrow 51 to obtain maximum sharp focus. When reversing the direction of the arrow 44, this process takes place in the opposite sense.

It is the function of the balancing unit 38 to prepare for the automatic focusing of the stereoscopic microscope by making an initial visual adjustment to obtain maximum visual image sharpness. For initial adjustment of the focusing, the switch 41 is connected to the contact 42. A motor potentiometer included in the balancing unit 38 is then adjusted manually in such manner that no current will be supplied to the focusing motor 40 at the point of maximum visual image sharpness. However, upon re-connection of the switch 41 to the contact 43, the stereoscopic microscope may be readjusted into the focal plane whenever defocusing occurs. It is also possible to operate the automatic focusing arrangement either intermittently or constantly. This is of significance particularly when, during surgical operations, the object is covered by instruments for which no sharp focusing adjustment is intended. Under such circumstances, the arrangement preferably is operated automatically only during the time when the instruments have been withdrawn.

The use of a common objective lens 1 for the two stereoscopic paths of rays of the present embodiment is not vital to the invention.

The arrangement is usable also with minor modifications for two completely separate stereoscopic paths of rays. Further, use of only one of the two stereoscopic paths of rays for the directional control of the pulse light is also possible.

What is claimed is:

1. A method for the automatic focusing of stereoscopic microscopes having divided observation beams for binocular observation of an object plane which comprises generating a focusing beam, directing said focusing beam to impinge upon said object plane to form a luminous area thereon which is superimposed on the observation beams impinged on said object plane and is reflected by said object along the respective divided paths of said observation beams, deflecting those portions of said focusing beams which are reflected by said object along each of the divided paths of said observation beams to direct said focusing beams, respectively, to impinge upon separate photoelectric detectors which convert axial shifts of the object plane of said luminous area with respect to said microscope during transverse movement of said luminous area in front of said photoelectric detectors into directionally dependent electric signals, and using said signals to control a focusing motor to move said microscope to compensate for such axial shifts.

2. A method as claimed in claim 1 in which said focusing beams are infrared beams.

3. A method as claimed in claim 1 in which the deflected portions of said focusing beams are each partially intercepted in the same direction to partially block the respective beams.

4. Apparatus for the automatic focusing of the stereomicroscopes having eyepieces and objective lenses with two stereoscopic beams therebetween having separated paths for stereoscopic observation of an object, comprising means for generating a focusing beam, means for directing said focusing beam onto said object to be reflected by said object along the separate paths of said two stereoscopic beams, means for deflecting the reflected portions of said focusing beam out of said stereoscopic paths and along two separated paths lying outside of said stereoscopic paths, a pair of photoelectric detectors, means for directing each of said deflected focusing beams to impinge onto one of said detectors, means including a differential amplifier connected to both of said detectors for converting differences in the movement of the focusing beams impinging on said detectors resulting from axial shifts of said object with respect to said objective lenses into directionally dependent signals, and means including a focusing motor controlled by said signals to move said microscope to compensate for such axial shifts.

5. Apparatus as claimed in claim 4 in which said means for generating a focusing beam comprises a pulse light source emitting radiation in the infrared range of about 900 nm.

6. Apparatus as claimed in claim 5 in which said pulse light source comprises a gallium arsenide luminescence diode.

7. Apparatus as claimed in claim 5 in which said photoelectric detectors are silicon photodiodes for detecting such radiation.

8. Apparatus as claimed in claim 5 in which said deflecting means includes beam splitters which are substantially transparent to visible light and which reflect light predominantly in the infrared range.

9. Apparatus as claimed in claim 4 including beam intercepting means comprising a pair of opaque blades which are mounted in the respective paths of said deflected beam, said blades extending in the same direction to partially block the respective beams.

10. Apparatus as claimed in claim 4 in which said objective lenses include a single objective lens common to said two stereoscopic paths which also serves to image onto the object an area of light emitted by said pulse light source.

* * * * *